(12) United States Patent
Nortz et al.

(10) Patent No.: US 10,819,762 B2
(45) Date of Patent: *Oct. 27, 2020

(54) SYSTEM AND METHOD FOR DELIVERING CONTENT OVER A MULTICAST NETWORK

(71) Applicant: AT&T Intellectual Property I, L.P., Atlanta, GA (US)

(72) Inventors: Douglas M. Nortz, Red Bank, NJ (US); Mark W. Altom, Martinsville, NJ (US); Robert J. Sayko, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,224

(22) Filed: Jun. 28, 2019

(65) Prior Publication Data

US 2019/0319997 A1 Oct. 17, 2019

Related U.S. Application Data

(63) Continuation of application No. 15/625,540, filed on Jun. 16, 2017, now Pat. No. 10,348,788, which is a continuation of application No. 15/052,001, filed on Feb. 24, 2016, now Pat. No. 9,686,331, which is a continuation of application No. 14/618,192, filed on Feb. 10, 2015, now Pat. No. 9,294,528, which is a continuation of application No. 14/092,349, filed on Nov. 27, 2013, now Pat. No. 8,954,815, which is a continuation of application No. 13/104,701, filed on May 10, 2011, now Pat. No. 8,601,334.

(51) Int. Cl.
  *H04L 29/06* (2006.01)
  *H04L 12/18* (2006.01)
  *H04W 72/04* (2009.01)

(52) U.S. Cl.
  CPC ...... *H04L 65/4076* (2013.01); *H04L 12/1868* (2013.01); *H04L 12/1881* (2013.01); *H04L 65/4069* (2013.01); *H04L 65/80* (2013.01); *H04W 72/0446* (2013.01)

(58) Field of Classification Search
  CPC ...... H04L 65/60; H04L 65/607; H04L 65/608
  See application file for complete search history.

(56) References Cited

U.S. PATENT DOCUMENTS 6,061,820 A 5/2000 Nakakita et al.
6,256,673 B1 7/2001 Gayman et al.
(Continued)

OTHER PUBLICATIONS

Chen, Y.-W. and Chen, C.-Y.; "PAS: a new scheduling scheme for broadcasting a video over a single channel;" IET Communications, vol. 5, Issue 7; May 4, 2011; pp. 951-960.*

(Continued)

*Primary Examiner* — Joseph R Kudirka
(74) *Attorney, Agent, or Firm* — Guntin & Gust, PLC; John G. Rauch

(57) ABSTRACT

A system for delivering content over a network includes a server. The server is configured to divide the content into multiple segments, to create multiple data streams using the segments of the content, and to transmit each of the data streams via a respective multicast session, wherein a copy of each of the multiple segments is transmitted during a single time slot of the multicast session.

20 Claims, 5 Drawing Sheets

(56) References Cited

U.S. PATENT DOCUMENTS

| | | |
|---|---|---|
| 6,292,512 B1 | 9/2001 | Radha et al. |
| 6,484,212 B1 | 11/2002 | Markowitz et al. |
| 6,532,562 B1 | 3/2003 | Chou et al. |
| 6,651,103 B1 | 11/2003 | Markowitz et al. |
| 6,728,920 B1 | 4/2004 | Ebersman |
| 6,874,113 B2 | 3/2005 | Chao et al. |
| 6,901,083 B2 | 5/2005 | Wei et al. |
| 6,934,759 B2 | 8/2005 | Hejna, Jr. |
| 7,136,929 B2 | 11/2006 | Koprivica |
| 7,200,669 B2 | 4/2007 | Cheung et al. |
| 7,249,291 B2 | 7/2007 | Rasmussen et al. |
| 7,310,678 B2 | 12/2007 | Gunaseelan et al. |
| 7,391,526 B2 | 6/2008 | Nishimura |
| 7,406,497 B1 | 7/2008 | Markowitz et al. |
| 7,565,415 B1 | 7/2009 | Markowitz et al. |
| 7,831,730 B1 | 11/2010 | Markowitz et al. |
| 2003/0135863 A1 | 7/2003 | Van Der Schaar |
| 2004/0139219 A1 | 7/2004 | Radha |
| 2007/0005804 A1 | 1/2007 | Rideout |
| 2007/0044005 A1 | 2/2007 | Amram et al. |
| 2007/0211720 A1 | 9/2007 | Fuchs et al. |
| 2008/0109857 A1 | 5/2008 | Goodwill et al. |
| 2008/0225850 A1 | 9/2008 | Oran et al. |
| 2009/0063561 A1 | 3/2009 | Sayko et al. |
| 2009/0182813 A1 | 7/2009 | McCartie et al. |
| 2009/0248886 A1 | 10/2009 | Tan et al. |
| 2010/0023828 A1 | 1/2010 | Weinman et al. |
| 2011/0016307 A1 | 1/2011 | Killian et al. |
| 2011/0314107 A1 | 12/2011 | Garcia |
| 2012/0151039 A1 | 6/2012 | Sayko et al. |

OTHER PUBLICATIONS

Callico et al., "Real-Time and Low Cost Incremental Super-Resolution over a Video Encoder IP Block," Applied Microelectronics Research Institute Department of Elect. and Automatic Engineering, ULPGC, Canary Islands, Spain, www.iuma.ulpgc.es.

"Scalable Video Coding," Wikipedia, Jul. 15, 2010 http://en.wikipedia.org/wiki/Scalable_Video_Coding.

"Adam7 Algorithm," Wikipedia http://en.wikipedia.org/wiki/Adam7_algorithm.

"Bitrate Peeling," Wikipedia http://en.wikipedia.org/wiki/Bitrate_peeling.

U.S. Appl. No. 12/966,489, filed Dec. 13, 2010.

Taleb et al., "Neighbors-buffering-based video-on-demand architecture," Elsevier, Signal Processing-image Communication, vol. 18, No. 7, pp. 515-526, Aug. 2003.

Taleb et al., "A global Video-on-Demand Architecture Based on a Novel Constellation Composed of Quasi-Geostationary Satellites," MWCN 2005 Morocco, pp. 1-5, 2005.

U.S. Appl. No. 11/561,237, filed Nov. 17, 2009.

\* cited by examiner

SYSTEM AND METHOD FOR DELIVERING CONTENT OVER A MULTICAST NETWORK

CROSS-REFERENCE TO RELATED APPLICATION

This application is a continuation of U.S. patent application Ser. No. 15/625,540, filed Jun. 16, 2017, which is a continuation of U.S. patent application Ser. No. 15/052,001, filed Feb. 24, 2016, now U.S. Pat. No. 9,686,331, which is a continuation of U.S. patent application Ser. No. 14/618,192, filed Feb. 10, 2015, now U.S. Pat. No. 9,294,528, which is a continuation of U.S. patent application Ser. No. 14/092,349, filed on Nov. 27, 2013, now U.S. Pat. No. 8,954,815, which is a continuation of U.S. patent application Ser. No. 13/104,701, filed on May 10, 2011, now U.S. Pat. No. 8,601,334, all of which are herein incorporated by reference in their entireties.

FIELD OF THE DISCLOSURE

The present disclosure generally relates to communications networks, and more particularly relates to content delivery networks.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
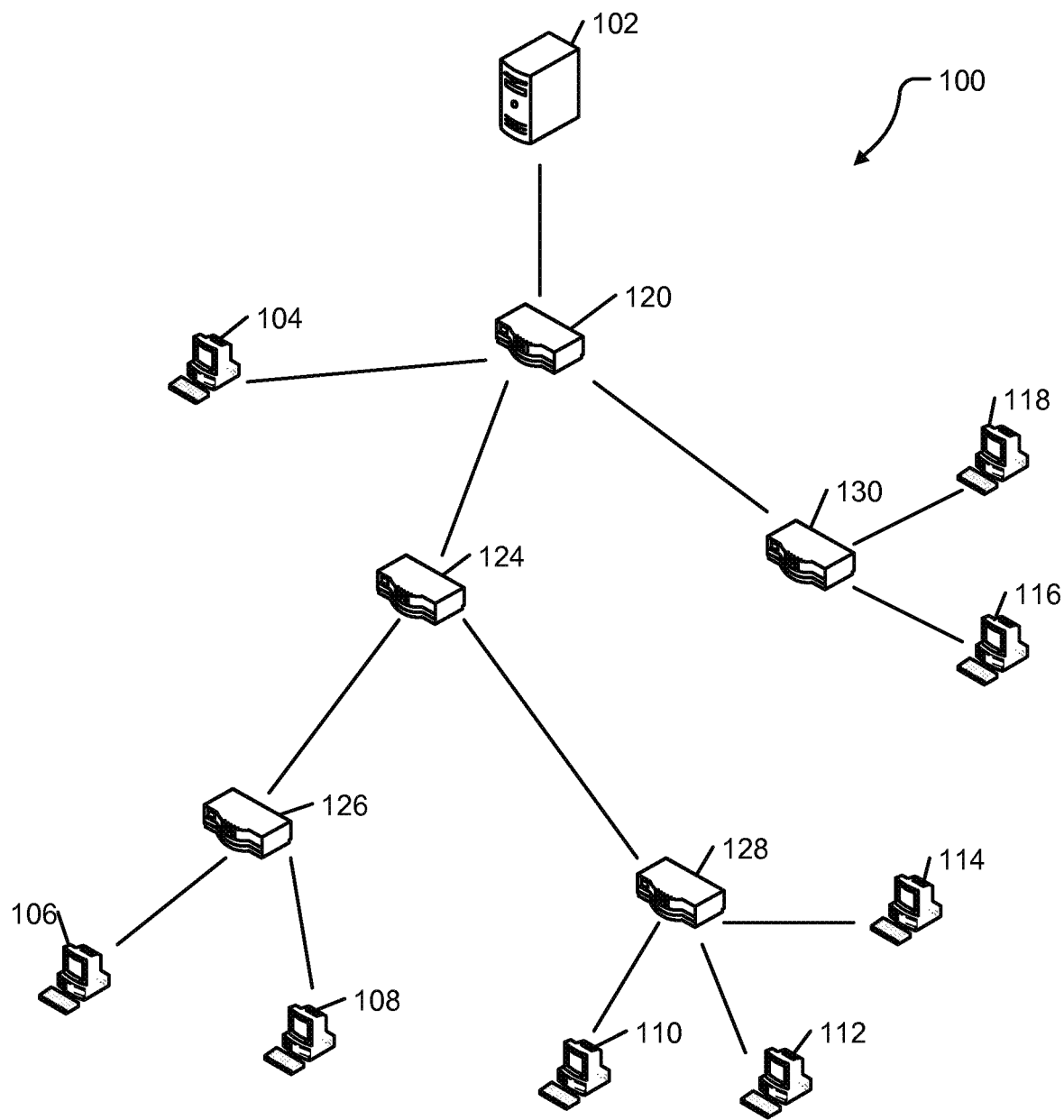
FIG. 1 is a diagram illustrating a geographically dispersed network in accordance with one embodiment of the present disclosure.

FIG. 1 shows a multicast tree 100 for distributing digital content through a geographically dispersed network, such as the Internet. Multicast tree 100 can include a server 102 and client devices 104, 106, 108, 110, 112, 114, 116, and 118. Server 102 and client devices 104, 106, 108, 110, 112, 114, 116, and 118 can communicate through a network of distribution points 120, 124, 126, 128, and 130. The distribution points 120, 124, 126, 128, and 130 may be routers. Alternatively, the distribution points 120, 124, 126, 128, and 130 may be nodes of an overlay network. For example, communications from server 102 can travel through distribution points 120, 124, and 126 to client device 108 while communications from server 102 can travel through distribution points 120 and 130 to client 116. It will be appreciated that multicast tree 100 may be a logical overlay of a mesh network that, for example, may have a direct connection from distribution point 130 to 128, and also, for example, may have a direct connection from distribution point 126 to 130. These distribution points may be multicast-enabled routers. The distribution points may have the ability to cache content not only for immediate forwarding but also for later retransmission.

Server 102 can use Internet Protocol (IP) multicast or any other multicast protocol to substantially simultaneously distribute digital content to the client devices 104, 106, 108, 110, 112, 114, 116, and 118. The digital content can be divided into multiple segments or data packets that may be, but are not necessarily IP packets, Ethernet frames, or similar lower layer packets. Using a multicast protocol, each such segment or data packet can move over each link of the network only once. The distribution points 120, 124, 126, 128, and 130 can create copies, or otherwise forward incoming data on one port to multiple outbound ports, when the paths to the destinations split. For example, server 102 can send a multicast data packet to distribution point 120. Distribution point 120 can send a copy of the data packet to each of client 104, distribution point 124, and distribution point 130. Similarly, distribution point 130 can send, forward, or route a copy of the segment, data packet, or individual low layer packets to each of client devices 116 and 118, and distribution point 124 can send a copy of the data packet to each of distribution points 126 and 128. Further, distribution point 126 can send a copy of the data packet to each of client devices 106 and 108, and distribution point 128 can send a copy of the data packet to each of client devices 110, 112, and 114. In other embodiments, the network underlying multicast tree 100 may be a shared medium, such as a bus or ring, with multicast occurring at a low network layer via common physical components and a common media access structure.

Generally, the distribution points construct or join the multicast tree 100 when client devices join a multicast group, and the server 102 may not have information about each member of the multicast group. Specifically, client devices can notify the network that they are interested in receiving data packets sent to the multicast group, such as by Internet Group Management Protocol. The server 102 can send a message addressed to the multicast group and each distribution point can replicate the data packet for each system of the multicast group.

Figure 2:
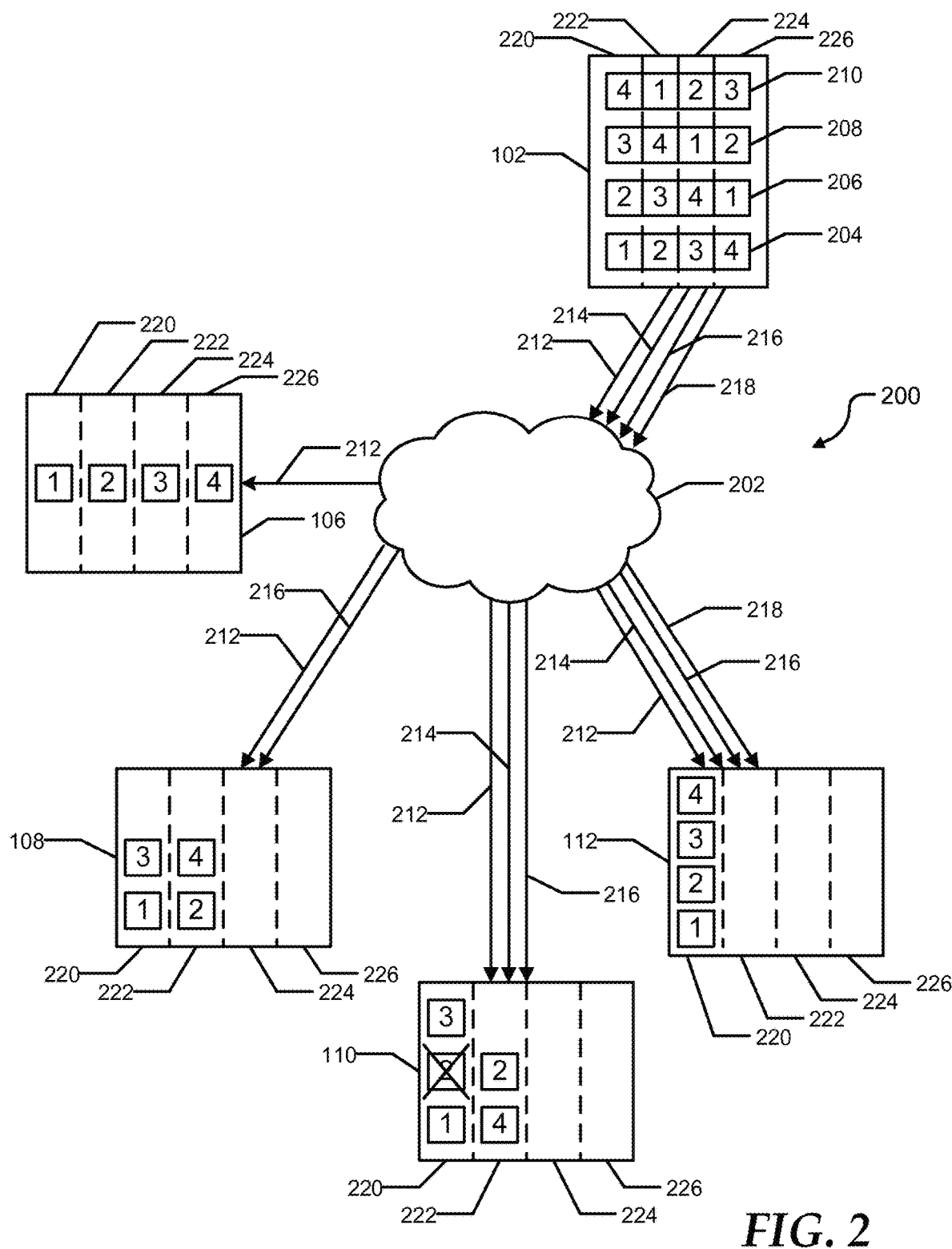
FIG. 2 is a block diagram illustrating a system for delivering content in accordance with one embodiment of the present disclosure.

FIG. 2 illustrates an exemplary system 200 for delivery of content. The system 200 includes the server 102, which can deliver the content to the client devices 106, 108, 110 and 112 via a network 202. The content can be a large data file, such as a software update or the like. The content can be divided into multiple segments, as illustrated by blocks 1, 2, 3, and 4, and each of the data segments can be replicated and placed in multiple data streams 204, 206, 208, and 210. Each of the data streams 204, 206, 208, and 210 can include all of the segments of the content, and can continually repeat the segments in the data stream. However, a segment in one data stream can be staggered in time from a copy of that segment in another data stream, such that server 102 can transmit every segment of the content during a single time slot.

For example, when server 102 transmits data stream 204 to the network 202, segment 1 of the content can be sent during a first time slot 220, segment 2 can be sent during a second time slot 222, segment 3 can be sent during a third time slot 224, and segment 4 can be sent during a fourth time slot 226. After segment 4 has been transmitted in data stream 204, server 102 can repeat the segments in the data stream in the same order described above, such as segment 1, then segment 2, then segment 3, and then segment 4.

When server 102 transmits data stream 206 to the network 202, segment 2 can be sent during the first time slot 220, segment 3 can be sent during the second time slot 222, segment 4 can be sent during the third time slot 224, and segment 1 can be sent during the fourth time slot 226. After segment 1 has been transmitted in data stream 206, server 102 can repeat the segments in the same order as described above, such as segment 2, then segment 3, then segment 4, and then segment 1.

When server 102 transmits data stream 208 to the network 202, segment 3 can be sent during the first time slot 220, segment 4 can be sent during the second time slot 222, segment 1 can be sent during the third time slot 224, and segment 2 can be sent during the fourth time slot 226. After segment 2 has been transmitted in data stream 208, server 102 can repeat the segments in the same order as described above, such as segment 3, then segment 4, then segment 1, and then segment 2.

When server 102 transmits data stream 210 to the network 202, segment 4 can be sent during the first time slot 220, segment 1 can be sent during the second time slot 222, segment 2 can be sent during the third time slot 224, and segment 3 can be sent during the fourth time slot 226. After segment 3 has been transmitted in data stream 210, server 102 can repeat the segments in the same order as described above, such as segment 4, then segment 1, then segment 2, and then segment 3.

Each segment of the content can be self contained data, such that error detection can be performed on a segment by segment basis. If one of the segments is received with an error, then only that segment may need to be downloaded again. The segments can include metadata to identify the segment, to provide the client devices with the sequence of the segments in each of the data streams, and to provide information for error detection. For example, each segment can include a codeword that has a check value associated with the data in the segment. When the client device 106, 108, 110, or 112 receives the segment, the client device can perform a cyclic redundancy check (CRC) for the segment to check for errors. The client device 106, 108, 110, or 112 can perform the error check by removing the codeword and check value from the metadata, and comparing the check value in the codeword to a check value calculated by the client device based on the data in the segment as received from the network 202. If the check values do not match, then the segment may be determined to contain one or more bit errors and the client device 106, 108, 110, or 112 may then attempt to re-receive that segment from the server 102. However, if the check values do match, the client device can assume that the segment is error-free and can store the segment in a memory of the client device for later use.

The server 102 can deliver data streams 204, 206, 208, and 210 to network 202 in multicast sessions 212, 214, 216, and 218. In an embodiment, multicast session 212 can deliver data stream 204, multicast session 214 can deliver data stream 206, multicast session 216 can deliver data stream 208, and multicast session 218 can deliver data stream 210.

Client devices 106, 108, 110, and 112 can each receive one or more of the multicast streams to obtain the content. The number of multicast sessions received by each of client devices 106, 108, 110, and 112 can depend on the available bandwidth for the client device, which can dynamically change based on fluctuations in the network 202 while the client device is downloading the content. The fluctuations in the network 202 can be based on the number of client devices accessing the network during a particular time period, or other network constraints. Each of the data streams 204, 206, 208, and 210 can be transferred to the network at the same speed or at different speeds. For example, each of the data streams 204, 206, 208, and 210 can be sent at a transfer rate of 100 Kilobytes per second (Kbps).

Client device 106 may be restricted in available bandwidth, such that the client device does not have enough bandwidth to receive all of the data streams 204, 206, 208, and 210 from the network 202 at the same time. That is, client device 106 may be located in a region where a lot of additional client devices are accessing network 202 so that the available bandwidth for the client device is limited to about 100 Kbps. Thus, the client device 106 may only receive one multicast session at a time. As such, client device 106 can connect to any one of the multicast sessions 212, 214, 216, and 218, and can receive all of the content within four time slots. For example, if client device 106 receives multicast session 212, the client device 106 can receive segment 1 of the content during the first time slot 220, segment 2 during the second time slot 222, segment 3 during the third time slot 224, and segment 4 during the fourth time slot 226.

When the client device 106 has received all of the segments, the client device can perform error detection on the segments. If the client device 106 detects an error in one of the segments, the client device can use the metadata in the segments to determine which of the multicast sessions can deliver the segment during the next time slot. The client device 106 can then join that multicast session.

Client device 108 may have about twice the available bandwidth as client device 106. For example, client device 108 can have an available bandwidth of 200 Kbps, such that the client device can receive two multicast sessions at a time. As such, client device 108 can connect to any two of the multicast sessions 212, 214, 216, and 218 at substantially the same time, and can receive all of the content from the network 202 within two time slots. The client device 108 can use the metadata in the segments to determine which two multicast sessions can provide the client device with each of the segments in a shortest number of time slots, such as multicast sessions 212 and 216. For example, client device 108 can receive both segment 1 via data stream 204 in the multicast session 212 and segment 3 via data stream 208 in the multicast session 216 during the first time slot 220. The client device 108 can then receive both segment 2 via data stream 204 in the multicast session 212 and segment 4 via data stream 208 in the multicast session 216 during the second time slot 222.

When the client device 108 has received all of the segments, the client device can perform error detection on the segments. If the client device 108 detects an error in one of the segments, the client device can use the metadata in the segments to determine which of the multicast sessions can deliver the segment during the next time slot. The client device 108 can then receive that multicast session.

Client device 110 may have access to more available bandwidth than both client devices 106 and 108. For example, client device 110 can have an available bandwidth of 300 Kbps, and can receive three multicast sessions at a time. As such, client device 110 can connect to any three of the multicast sessions 212, 214, 216, and 218 at substantially the same time, and can receive all of the content from the network 202 within two time slots. The client device 110 can use the metadata in the segments to determine which multicast sessions can provide the client device with each of the segments in the shortest number of time slots, such as multicast sessions 212, 214, and 216.

For example, during the first time slot 220 client device 110 can receive segment 1 via data stream 204 in the multicast session 212, segment 2 via data stream 206 in multicast session 214, and segment 3 via data stream 208 in the multicast session 216. Client device 110 can then receive segment 4 via data stream 210 in the multicast session 216 during the second time slot 222.

However, if an error is detected in one of the segments received during the first time slot 220, such as segment 2, the client device 110 can utilize the metadata to determine which multicast session can provide the segment during the second time slot 222. That is, the client device 110 can determine that multicast session 212 can provide segment 2 during the second time slot 222, and can then receive segment 2 via data stream 204 in the multicast session 212 during the second time slot.

Client device 112 may have enough available bandwidth, such as 400 Kbps, to enable the client device to receive all four multicast sessions at one time. As such, client device 112 can connect to all of the multicast sessions 212, 214, 216, and 218 and receive all of the content within one time slot. For example, during the first time slot 220 client device 112 can receive segment 1 via data stream 204 in the multicast session 212, segment 2 via data stream 206 in multicast session 214, segment 3 via data stream 208 in the multicast session 216, and segment 4 via data stream 210 in the multicast session 218. If client device 112 detects any errors, the client device can use the metadata in the segments to determine which of the multicast sessions 212, 214, 216, and 218 can provide the segment or segments during the next time slot, such as the second time slot 222.

Figure 3:
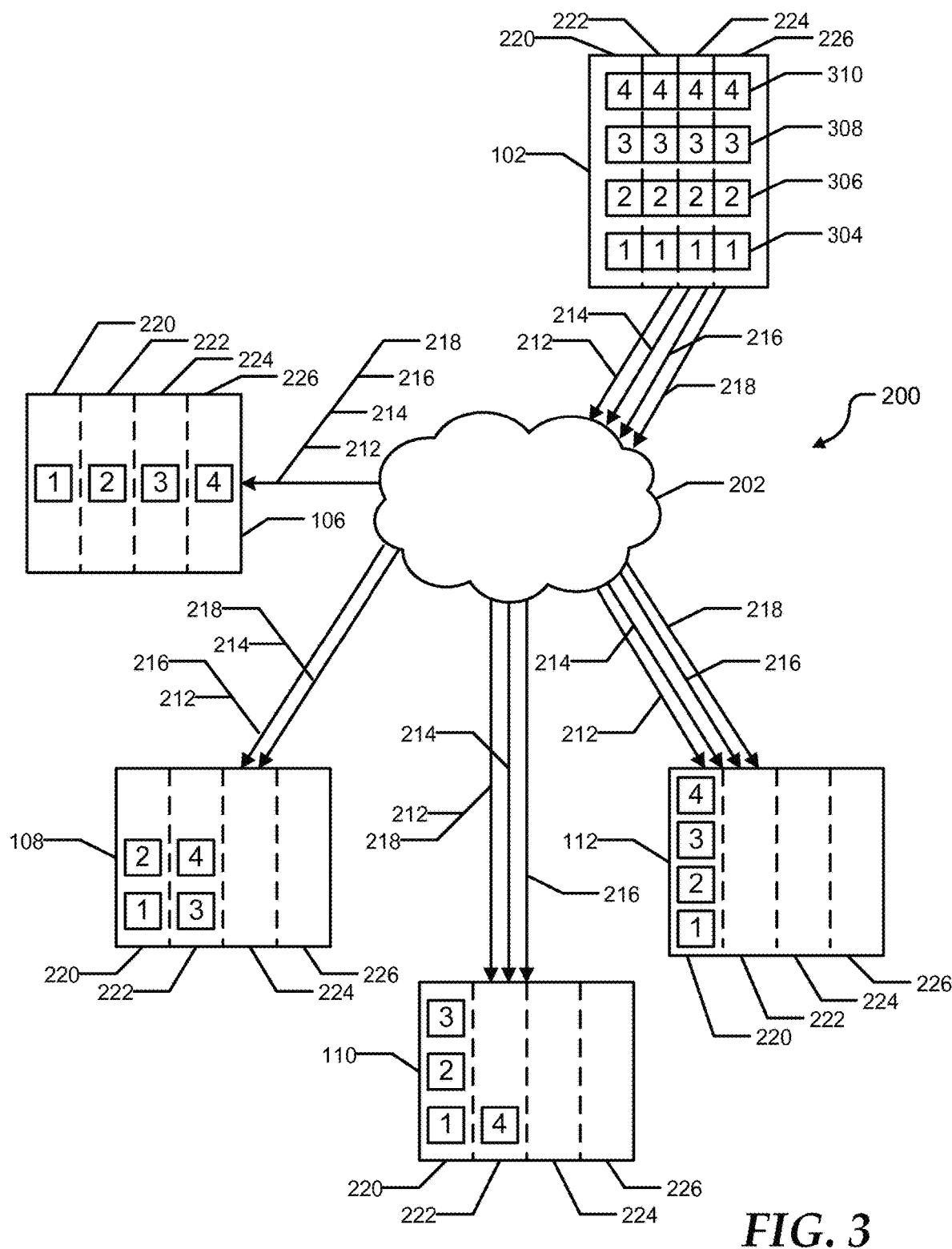
FIG. 3 is a block diagram illustrating the system for delivering content in accordance with another embodiment of the present disclosure.

FIG. 3 illustrates another embodiment of the exemplary system 200 for delivering the content. The system 200 can include the server 102, which can deliver the content to the client devices 106, 108, 110 and 112 via network 202. The server 102 can divide the content into the multiple segments, as illustrated by blocks 1, 2, 3, and 4, and can replicate each data segment. The server 102 can then place all of the replicated copies of one segment in an individual data stream 304, 306, 308, or 310.

For example, data stream 304 can include only segment 1, such that segment 1 is transmitted in data stream 304 during each of the time slots 220, 222, 224, and 226. Similarly, data stream 306 can include only segment 2, such that segment 2 is transmitted in data stream 306 during each of the time slots 220, 222, 224, and 226. Data stream 308 can include only segment 3, such that segment 3 is transmitted during each of the time slots 220, 222, 224, and 226. Data stream 310 can include only segment 4, such that segment 4 is transmitted in data stream 310 during each of the time slots 220, 222, 224, and 226.

If client device 106 is restricted in available bandwidth to about 100 Kbps, the client device may only receive one multicast session at a time. As such, client device 106 can switch between the multicast sessions 212, 214, 216, and 218 from one time slot to the next, and can receive all of the content within four time slots. For example, client device 106 can initially receive segment 1 of the content via data stream 304 in the multicast session 212 during the first time slot 220. Then, during the second time slot 222, the client device 106 can receive segment 2 of the content by receiving data stream 306 in the multicast session 214. During the third time slot 224, the client device can receive segment 3 of the content from data stream 308 in the multicast session 216. The client device can then receive segment 4 of the content via data stream 310 in the multicast session 218 during the fourth time slot 226. If the client device 106 detects that one or more of the received segments have errors, the client device can use the metadata of the segments to determine which multicast session provides that segment so that the client device can re-retrieve that segment during the next time slot.

Client device 108 may have an available bandwidth of 200 Kbps. As such, client device 108 can connect to any two of the multicast sessions 212, 214, 216, and 218 at substantially the same time to receive all of the content from the network 202 within two time slots. The client device 108 can use the metadata in the segments to determine which multicast sessions to receive based on any segments that the client device may already have received, so that the client device can receive all of the segments in the shortest number of time slots. For example, if client device 108 received segment 1 via data stream 304 in the multicast session 212 and segment 2 via data stream 306 in the multicast session 214 during the first time slot 220, then the client device can use the metadata to determine that multicast sessions 216 and 218 can provide segments 3 and 4. The client device 108 can then receive segment 3 via data stream 308 in the multicast session 216 and segment 4 via data stream 310 in the multicast session 218 during the second time slot 222.

Client device 110 may have access to about 300 Kbps of available bandwidth, such that the client device can receive three multicast sessions at a time. As such, client device 106 can connect to any three of the multicast sessions 212, 214, 216, and 218 at substantially the same time to receive all of the content from the network 202 within two time slots. For example, during the first time slot 220 client device 110 can receive segment 1 via data stream 304 in the multicast session 212, segment 2 via data stream 306 in multicast session 214, and segment 3 via data stream 308 in the multicast session 216. Client device 110 can then receive segment 4 via data stream 310 in the multicast session 218 during the second time slot 222.

Client device 112 may have enough available bandwidth, such as 400 Kbps, to enable the client device to receive all four multicast sessions at a time. As such, client device 106 can connect to all of the multicast sessions 212, 214, 216, and 218 and receive all of the content within one time slot. For example, client device 106 can receive segment 1 via data stream 304 in the multicast session 212, segment 2 via data stream 306 in multicast session 214, segment 3 via data stream 308 in the multicast session 216, and segment 4 via data stream 310 in the multicast session 218 during the first time slot 220.

Figure 4:
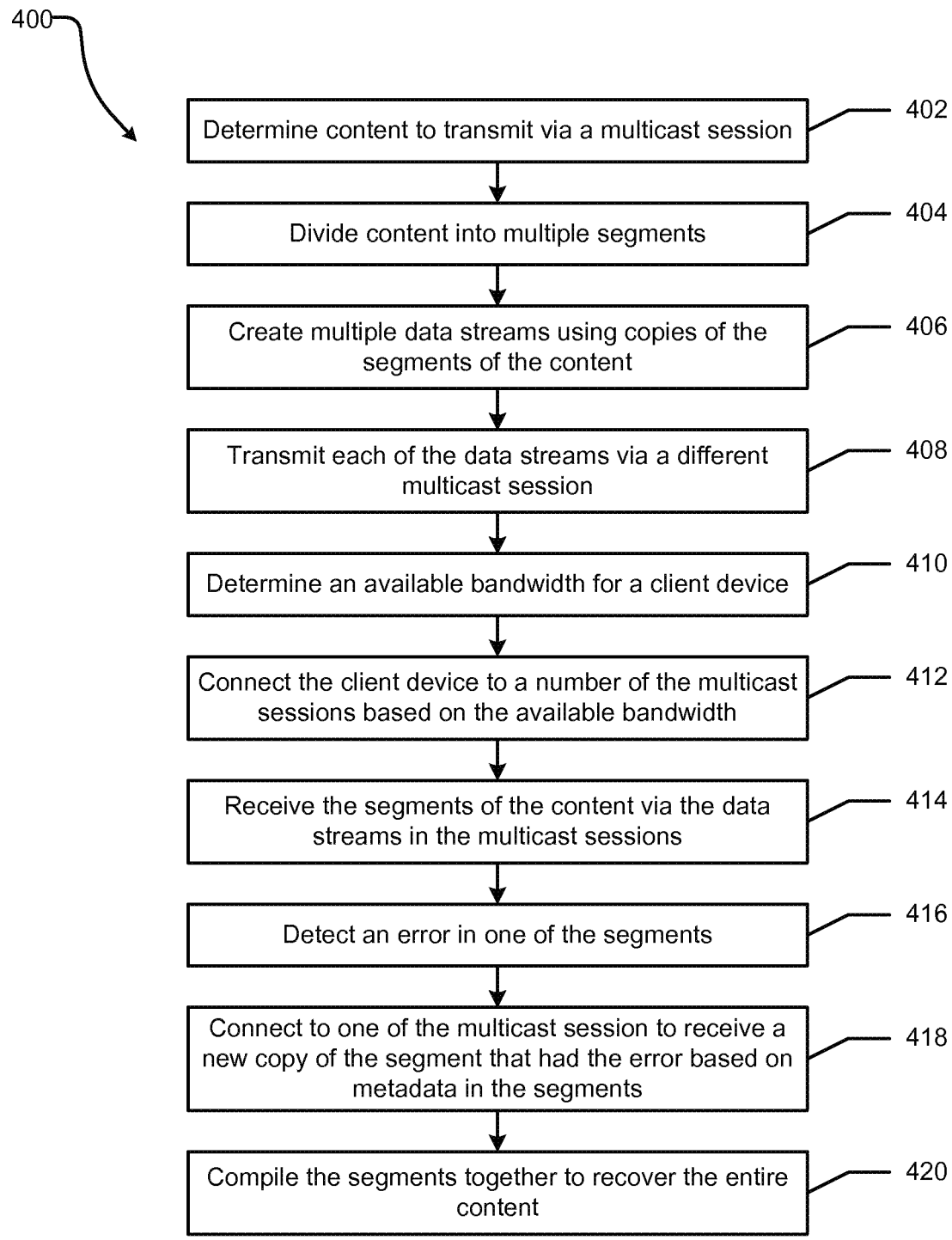
FIG. 4 is a flow diagram illustrating a method for delivering multicast content.

FIG. 4 shows a flow diagram of a method 400 for delivering multicast content. At block 402, content to transmit via a multicast session is determined. The content is divided into multiple segments at block 404. At block 406, multiple data streams are created using multiple copies of the segments of the content. In one embodiment, a data stream can continually repeat only copies of a single segment of the content. In another embodiment, each data stream can continually repeat copies of each of the segments. When each data stream includes copies of each of the segments, a segment in one data stream can be staggered in time as compared to another data stream so that all of the data streams can be transmitted within a single time slot. Each of the data streams are transmitting via a different multicast session at block 408.

At block 410, an available bandwidth for a client device is determined. The client device is connected to a number of the multicast sessions based on the available bandwidth at block 412. For example, the more bandwidth available to the client device, the more multicast sessions the client device can connect to. At block 414, the segments are received by the client device via the data streams in the multicast sessions. An error is detected in one of the segments at block 416. The error can be detected using CRC or the like. At block 418, one of the multicast sessions is connected to based on metadata in the segments to receive a new copy of the segment that had the error. The segments are compiled together to recover the content at block 420.

Figure 5:
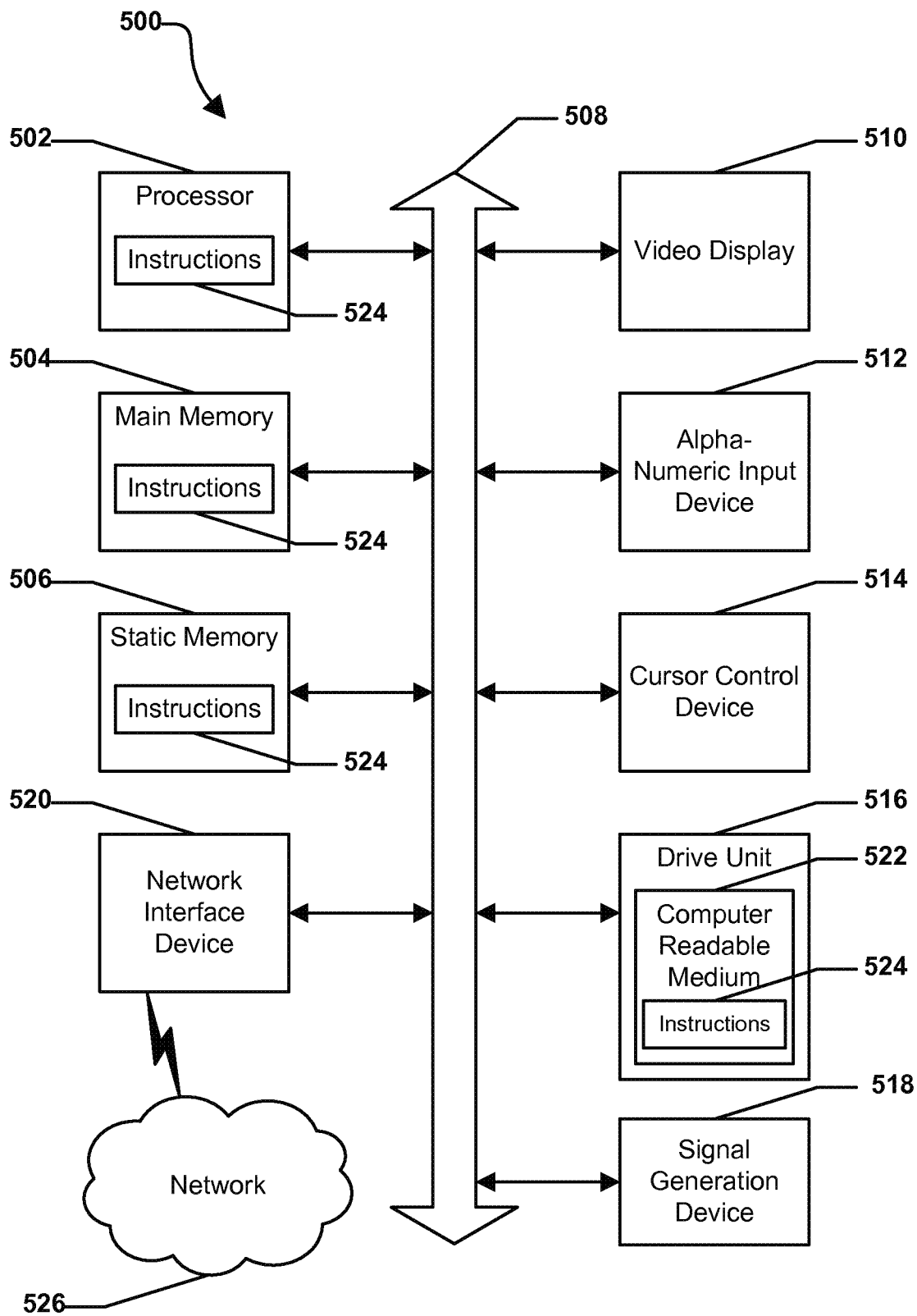
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid state display, or a cathode ray tube (CRT). Additionally, the computer system 500 may include an input device 512 such as a keyboard, and a cursor control device 514 such as a mouse. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. The computer-readable medium can be a non-transitory computer readable medium, such as a hard disk drive, a flash memory, a read-only memory, a compact disk, a digital versatile disk, a cache, a random-access memory, and the like. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are

What is claimed is:

1. A system, comprising:
   at least one memory that stores instructions; and
   at least one processor that executes the instructions to perform operations, the operations comprising:
   staggering a first set of multiple segments of content in a first data stream of a plurality of data streams in time from a second set of the multiple segments of the content in a second data stream of the plurality of data streams so that the first and second data streams are transmitted during a same time period.

2. The system of claim 1, wherein the operations further comprise transmitting each data stream of the plurality of data streams in a separate multicast session.

3. The system of claim 1, wherein the operations further comprise facilitating a client device to connect to a number of multicast sessions.

4. The system of claim 1, wherein the operations further comprise dividing the content into the first and second set of multiple segments.

5. The system of claim 1, wherein the operations further comprise creating the first data stream using a copy of each of the multiple segments in the first set.

6. The system of claim 1, wherein the operations further comprise determining an available bandwidth of a client device.

7. The system of claim 6, wherein the operations further comprise facilitating connection of the client device to a number of multicast sessions associated with the first data stream, the second data stream, or a combination thereof, based on the available bandwidth.

8. The system of claim 1, wherein the operations further comprise detecting an error in a segment of the first set of the multiple segments of the content.

9. The system of claim 1, wherein the operations further comprise connecting to a multicast session based on metadata in a segment of the first set of the multiple segments, wherein the metadata indicates information to receive a new copy of a segment containing an error.

10. The system of claim 1, wherein the operations further comprise generating copies of the multiple segments in the first set, the second set, or a combination thereof.

11. The system of claim 1, wherein the operations further comprise utilizing metadata in a segment of the multiple segments of the first set, the second set, or a combination thereof, to determine which multicast session can provide the multiple segments during the time period.

12. The system of claim 1, wherein the operations further comprise adjusting a number of multicast sessions received by a client device based on a fluctuation in a network.

13. The system of claim 12, wherein the operation further comprise transmitting the first and second data streams to a network at a same speed or at different speeds.

14. A method, comprising:
    staggering, by utilizing instructions from a memory that are executed by a processor, a first set of multiple segments of content in a first data stream of a plurality of data streams in time from a second set of the multiple segments of the content in a second data stream of the plurality of data streams so that the first and second data streams are transmitted during a same time period.

15. The method of claim 14, further comprising enabling a client device to switch between sessions of a plurality of multicast sessions from a first time slot to a next time slot.

16. The method of claim 14, further comprising utilizing metadata in a segment of the multiple segments of the first set, the second set, or a combination thereof, to determine which multicast session can provide the multiple segments during the time period.

17. The method of claim 14, further comprising identifying each segment of the first set and the second set based on metadata included within each segment.

18. The method of claim 14, further comprising identifying information for error detection from metadata within a segment of the first set, the second set, or a combination of the first and second sets.

19. The method of claim 14, further comprising providing a client device with a sequence of segments of the first set, the second set, or a combination thereof, based on metadata included within a segment of the first set, the second set, or a combination thereof.

20. A non-transitory computer-readable device comprising instructions, which when loaded and executed by a processor, cause the processor to perform operations, the operations comprising:
    staggering a first set of multiple segments of content in a first data stream of a plurality of data streams in time from a second set of the multiple segments of the content in a second data stream of the plurality of data streams so that the first and second data streams are transmitted during a same time period.

* * * * *